BENNETT & DRAKE.
Brake.
No. 65,332.          Patented June 4, 1867.
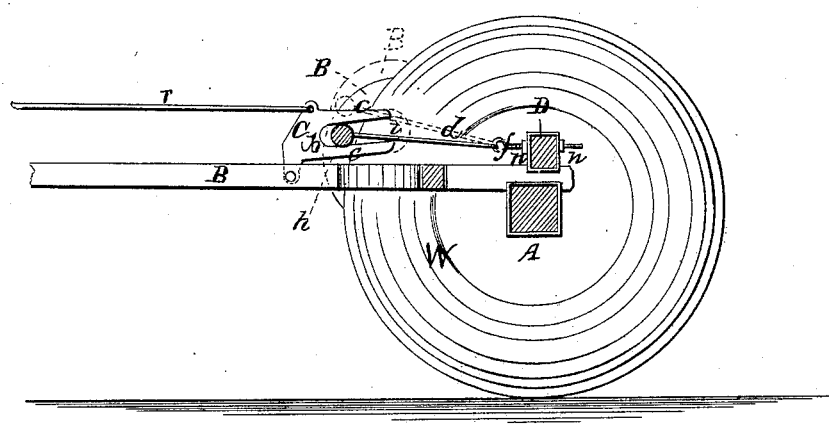
Witnesses.
Ira A. Hebbard
P. S. Sevier
Inventor
C. G. Bennett & J. A. Drake
By W. S. Loughborough
Atty

United States Patent Office.

C. G. BENNET AND S. A. DRAKE, OF FARMER VILLAGE, NEW YORK, ASSIGNORS TO C. G. BENNET, OF THE SAME PLACE.

Letters Patent No. 65,332, dated June 4, 1867.

---

IMPROVEMENT IN WAGON-BRAKE.

---

The Schedule referred to in these Letters Patent and making part of the same.

---

TO ALL WHOM IT MAY CONCERN:

Be it known that we, C. G. BENNET and S. A. DRAKE, of Farmer Village, in the county of Seneca, and State of New York, have invented a new and useful "Wagon-Brake;" and we do hereby declare that the following is a full, clear, and exact description thereof, reference being had to the accompanying drawing, making part of this specification, in which the figure is a side elevation of our invention, as applied to an ordinary wagon, portions of the "gearing" and the brake-bar $b$ being shown in section.

This invention consists mainly in hanging the brake-bar by jointed rods in such a manner that the revolving wheels, when the brake-blocks are allowed to drop upon their periphery, shall cause the brake to effectually lock them.

To enable others to make and use our invention, we will describe its construction and operation.

We attach a rod, $d$, to the cross-bar $b$, rigidly at each end near the block B, and hinge this rod to the bolster D by a suitable eyebolt, $f$, which is made adjustable by means of the set-nuts $n$, each side of the bolster. By this arrangement the brake-blocks are made to swing in the arc of a circle, instead of sliding to and from the face of the wheel. The axis or centre of this circle is eccentric from, yet near to, that of the wheel W, and consequently the two circles intersect each other. The nearer the axial point of the brake is located to the centre of the wheels the more powerful and sensitive will be the action of the brake, because the circles will approach each other at a sharper or more acute angle. The adjustable joint-bolt $f$ may be fixed in the axle-tree A, if desired. The cam or elevating anchor C may be pivoted in the reach R, and the two arms $c$ clasp the brake-bar $b$. The arms $c$ may connect, as represented, by the dotted circle $i$. The rod $r$ connects with the ordinary foot-lever at the front end of the vehicle. The brakes are removed from the wheels by drawing the rods $r$ forward, which draws the arms $c$ of the cam C up. The brake B is locked in its open position, as indicated by the dotted lines B', by hooking the ordinary foot-lever at the front end into the ratchet. This front lever and ratchet are not shown, as they are the same as those used in operating ordinary brakes.

It will be seen that when the brakes are hung in this way, the revolving wheels, as soon as the brake-blocks touch their periphery, immediately lock themselves, without any exertion on the part of the driver, instead of depending upon the strength of the operator to set the brakes effectually. It might be desirable to make the plate C like a snail-cam, and hang or pivot it under the bar $b$.

What we claim as our invention, and desire to secure by Letters Patent, is—

1. In combination with the brake-bar $b$, the relieving or raising cam C, constructed and operating substantially as and for the purposes herein shown and described.

2. Suspending the brake-blocks B of wagons and other vehicles from an axial point located near that of the ground-wheels W, substantially in the manner and for the purposes herein shown and described.

C. G. BENNET,
S. A. DRAKE.

Witnesses:
JNO. B. AVERY,
H. R. SILLECK.